United States Patent Office 3,454,311
Patented July 8, 1969

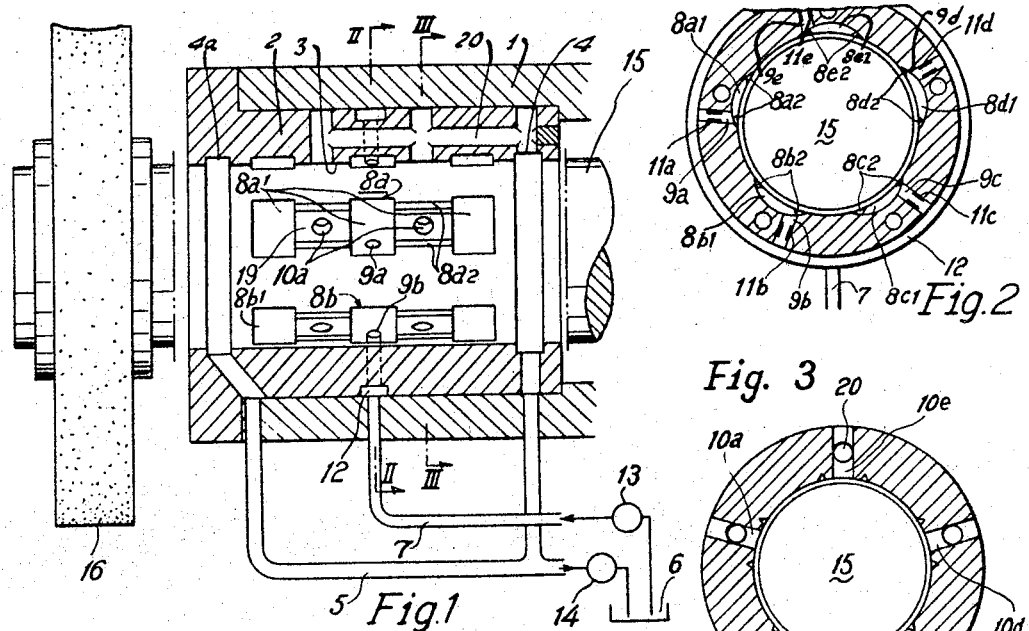
Fig. 1
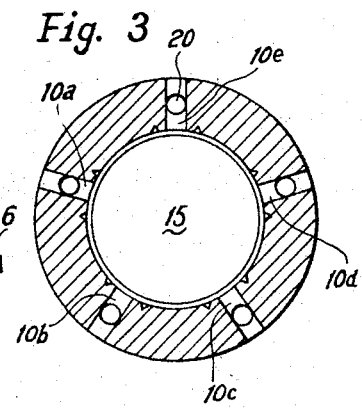
Fig. 2
Fig. 3
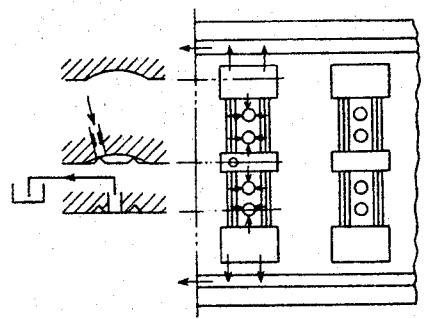
Fig. 5
Fig. 6
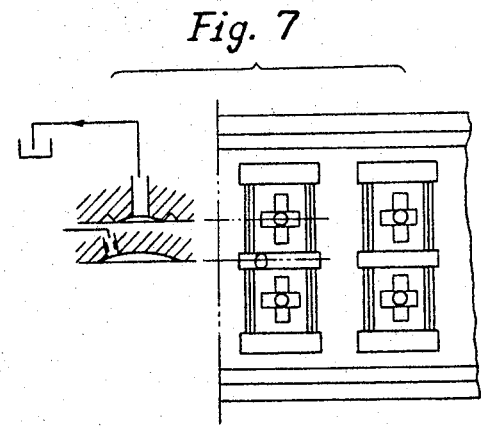
Fig. 7

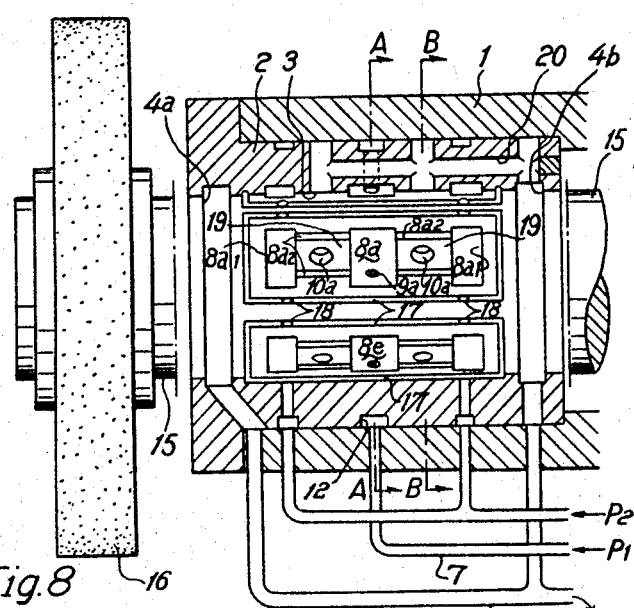
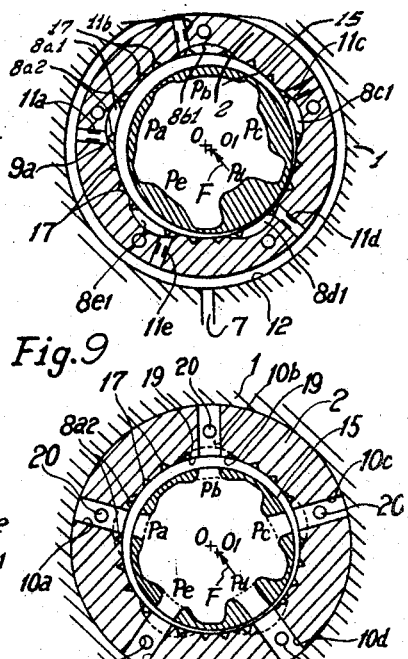
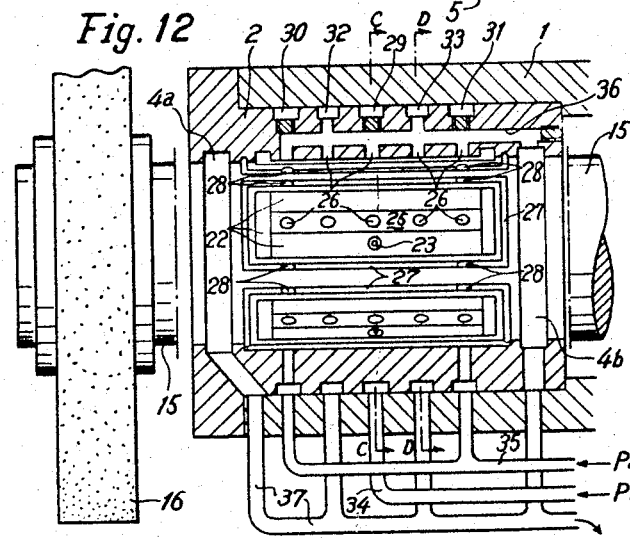
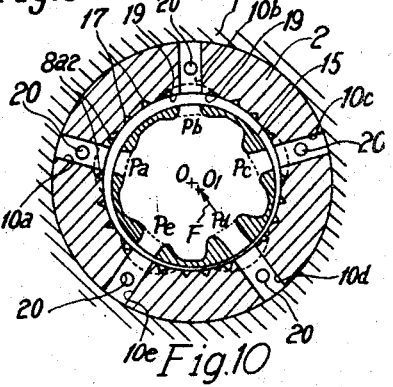
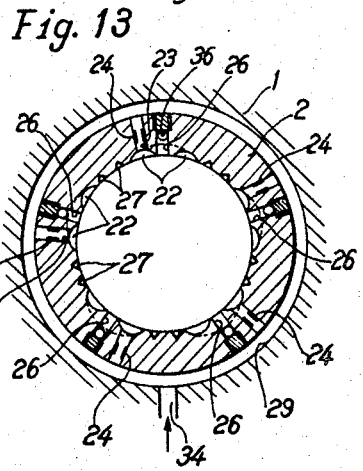
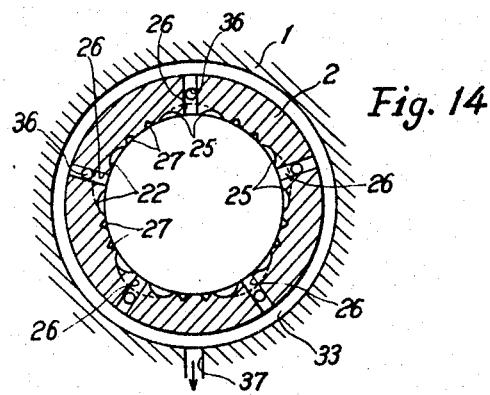

3,454,311
FLUID BEARING WITH A DAMPING EFFECT
Tamaki Tomita, Ryuji Wada, and Hayashi Kodama, Kariya, Japan, assignors to Toyoda Machine Works, Ltd., Kariya, Japan
Filed Jan. 31, 1967, Ser. No. 612,846
Claims priority, application Japan, Feb. 1, 1966, 41/6,011
Int. Cl. F16c 1/24
U.S. Cl. 308—122          5 Claims

ABSTRACT OF THE DISCLOSURE

A fluid bearing is provided which comprises a plurality of axially extended pressure compensating zones distributed in circumferentially spaced relation, each said pressure compensating zone being formed as an independent enclosure providing at least one inlet port for introducing pressure fluid and at least one outlet port for evacuating pressure fluid located selectively within said enclosure, there being no axially extending evacuating channels, a plurality of fluid film damping zones extending axially between said pressure compensating zones.

---

The present invention relates to a fluid bearing comprising means to impart a damping effect.

The main object of the present invention is to provide a fluid bearing having a very high rigidity, both static and kinetic, obtained by disposing fluid pressure compensating zones and fluid film damping zones alternately within its bearing surface.

In known fluid bearings, there are provided a plurality of circumferentially spaced and separated pressure zones, and axially extending outlet channels separating said pressure zones, wherein the discharge quantities of the pressure fluid supplied through fixed throttles into said pressure zones, from said pressure zones into said outlet channels are varied according to the variations of the bearing clearances. Static pressures responsive to said clearance variations are produced in said pressure zones, by which the rotating shaft is maintained within its bearing surface in floating condition. In other words, when the shaft becomes eccentric in its rotation within the bearing surface, the resulting variations of static pressures responsive to this eccentricity are produced in the corresponding pressure zones, and by controlling the supply of pressure fluid to suppress said variations, said eccentricity is corrected and an automatic centering function is imparted to the bearing. Thus, by means of these pressure zones and outlet channels therebetween, a so-called "pressure compensating zone" is constructed.

However, known fluid bearings provided with such means of control of static pressure have some inconveniences notably that, even though they have sufficient ability to correct and restore the deviations of the rotating shaft in the bearing after such deviations have already occurred, they have no adequate opposing means to suppress the tendency to cause deviations of the rotating shaft in the bearing. Moreover, when the rotating shaft is subjected to any oscillating or pulsating load, no reliable means to impart damping to suppress this oscillation is provided in the bearing structure.

The present invention relates to an improved fluid bearing, wherein such inconveniences of the conventional fluid bearings are avoided and means to impart effective damping is provided.

According to its principal characteristics, a fluid bearing of the invention has a structure which comprises a plurality of axially extended pressure compensating zones distributed in circumferentially spaced relation, each said pressure compensating zone being formed as an independent enclosure providing at least one inlet port for introducing pressure fluid and at least one outlet port for evacuating pressure fluid located selectively within said enclosure, there being no axially extending evacuating channels, a plurality of fluid film damping zones extending axially between said pressure compensating zones.

In this bearing structure, an overall "pressure compensating zone" serving to correct automatically the deviations of the rotating shaft is constituted by a group of respective of said pressure compensating zones, and an overall "fluid film damping zone" serving to suppress the oscillating movements of the rotating shaft under oscillating load is constituted by an assemblage of respective of said fluid film damping zones extending between said pressure compensating zones.

As is well known, the static rigidity of a bearing is the static load capacity of the shaft at rest, and the kinetic rigidity of a bearing is its ability to suppress the tendency to cause deviations of the rotating shaft.

This "fluid film damping effect" proposed in accordance with the present invention is a most important concept which is applicable directly to a conventional fluid bearing in order to improve its adaptability in the field of modern machine-tools.

As is mentioned above, in the bearing structure of the invention, each pressure compensating zone is formed as a separate independent enclosure comprising both means for introducing and evacuating pressure fluid therewithin, that is, as a self-contained construction. With this specific construction, the pressure compensating action is always carried out within each said enclosure without any disturbing effect outside of said enclosure. Accordingly, in each fluid film damping zone extending between said pressure compensating zones, there exists a relatively stable fluid (lubricating oil) film which is not disturbed by the flow of pressure fluid due to the pressure compensating action. Thus, the tendency to cause deviations of the rotating shaft is effectively suppressed by the hydrostatic squeezing effect of said stable oil film in the damping zones, whereby an effective damping by the lubricating oil film is obtained.

However, as the shaft is always pressed downwards by its weight and load, such stable oil film also shows a tendency to flow downwards slowly, until the thickness of the oil film existing between the shaft and the bearing surface at the bottom becomes nil. This proves that such lubricating oil film is strong enough against any oscillating or pulsating load, but is weak against any continuous load. On the contrary, a conventional fluid bearing as above-mentioned has an advantage that it is weak against any oscillating load, but is quite strong against such continuous load by utilizing its specific "static pressure compensating" means to restore any deviations of the shaft under such continuous load. From this fact, it will be easily understood how such an operatively combined structure of "static pressure compensating zone" and "fluid film damping zone" by the invention in a fluid bearing is effective. Thus, in a fluid bearing of the invention, the shaft can rotate quite stably in perfect floating condition under any continuous constant load and, moreover, during such stable rotation, a powerful damping action is always exterted against any oscillating load. Thereby, the bearing can work with constant high rigidity not only under static but also under kinetic conditions.

According to further characteristics of the invention, by establishing a constant pressure fluid zone at said fluid film damping zone, it is possible not only to raise the damping effect at this zone, but also to permit said each pressure compensating zone to effect a perfectly independent compensating action in said zone, and thereby it is possible to improve the overall centering function of said pressure compensating zone.

The constant pressure fluid zone is provided as follows:

In the bearing surface, a narrow groove is provided so as to surround each pressure compensating zone distributed circumferentially spaced and separated, and said narrow groove is fed by pressure fluid having a constant pressure at its inlet port selectively located in said groove, said constant pressure being selected as not higher than that supplied into said pressure compensating zone. Thus, each pressure compensating zone distributed circumferentially and surrounded by said narrow groove can work as a perfectly independent pressure compensating zone, and said constant pressure fluid zone surrounding said pressure compensating zone can exert excellent damping action by forming a stable film zone having a constant pressure.

In the following, the present invention will be described in detail, in connection with the accompanying drawing, in which:

FIG. 1 is a longitudinal sectional view of a first example of the present invention;

FIG. 2 is a sectional view along the line II—II of FIG. 1;

FIG. 3 is a sectional view along the line III—III of FIG. 1;

FIGS. 5, 6 and 7 are partial schematic illustrations showing variations of the bearing surfaces of the invention;

FIG. 8 is a longitudinal sectional view of a second example of the invention;

FIG. 9 is a sectional view along the line A—A of FIG. 8;

FIG. 10 is a sectional view along the line B—B of FIG. 8;

FIG. 12 is a longitudinal sectional view of a third example of the invention;

FIG. 13 is a sectional view along the line C—C of FIG. 12; and

FIG. 14 is a sectional view along the line D—D of FIG. 12.

Figure 4:
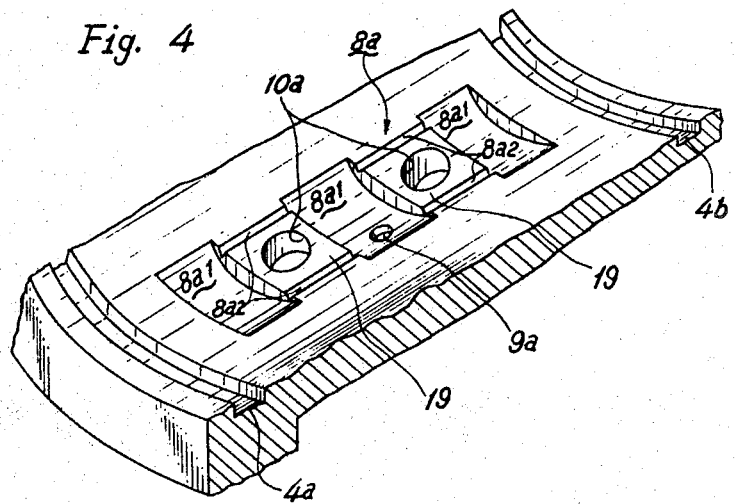
FIG. 4 is an enlarged partial perspective showing a main part of the bearing surface shown in FIG. 1.

Now, the first example of the present invention will be explained with reference to FIGS. 1, 2, 3 and 4.

In a bearing 2 mounted on a fixed member 1, there is provided longitudinally a bearing surface 3, and a grinding wheel shaft 15 having a finished outer surface is inserted into said bearing surface 3 with suitable clearance therebetween. Annular grooves 4a and 4b for evacuation of fluid are provided at each axial end of said bearing surface 3 and are connected respectively with a fluid reservoir 6 by means of channels perforated within said bearing 2 and said fixed member 1 and a pipe 5. Moreover, in the bearing surface 3, a plurality of axially extended pressure compensating zones 8a, 8b . . . are distributed in circumferentially spaced and separated relation, in such manner that the spacings between adjacent pressure compensating zones decreases towards the bottom of the bearing surface as shown in FIG. 2. Each said pressure compensating zone, for example 8a, is constituted by three circular arc shaped cavities 8a1 distributed axially and two parallel narrow grooves 8a2 connecting said cavities at their side edges, and forms an enclosure. An inlet port 9a for introducing pressure fluid is provided in at least one of said cavities 8a1, and said inlet port 9a has a throttle 11a and is connected with the reservoir 6 by means of an annular chamber 12, a perforated channel in the fixed member and a pipe 7. Within said enclosure, on two lands 19 of the bearing surface provided between said three cavities 8a1, two relatively large outlet ports 10a for evacuating pressure fluid are provided, and said ports 10a are connected with an annular groove 4b by means of a perforated channel 20 in the bearing body 2. All pressure compensating zones 8a, 8b . . . distributed in the bearing surface 3 have the same constructions as the abovementioned.

It will be noted that, between adjacent pressure compensating zones distributed circumferentially in spaced and separated relation in the bearing surface, there is provided no evacuating groove such as found in the known type of fluid bearing, but instead there is extended a uniform stable fluid film zone.

Such a structure works as follows:

A viscous and incompressible fluid, for example, a lubricating oil is supplied uniformly in the cavities 8a1, 8b1 . . . of the pressure compensating zones from the inlet ports 9a, 9b . . . having the throttles 11a, 11b . . ., through the annular chamber 12 and the pipe 7 by a pump 13. The supplied oil is conducted into each cavity 8a1, 8b1 . . . axially disposed in the bearing surface by the parallel grooves 8a2, 8b2 . . ., and thereby each pressure compensating zone 8a, 8b . . . in the bearing surface 2 is filled by this supply oil, which, due to the pressure difference existing between each evacuating port 10a, 10b . . . provided in each pressure compensating zone and the annular grooves 4a and 4b, is caused to flow into the clearance between the shaft 15 and the bearing surface 3, whereby the shaft 15 is supported in floating condition without touching the bearing surface. In this case, said clearance becomes quite uniform circumferentially, because said pressure compensating zones 8a, 8b . . . are distributed with decreasing spacings towards the bottom of the bearing surface. Thus, between adjacent pressure compensating zones 8a, 8b . . ., there is extended, over an extremely broad area as compared with the existing bearing clearance, a uniform and stable oil film zone and, due to this oil film zone, a most effective damping action is produced against oscillating or pulsating loads.

As schematically illustrated in FIGS. 5, 6 and 7, variations can be considered for the pressure compensating zones 8a, 8b . . . FIG. 5 shows a structure wherein a large number of evacuating ports as compared with FIG. 1 are provided. FIG. 6 shows a variant wherein two inlet ports are provided in both end cavities of the structure and a connecting groove is provided for outlet ports. FIG. 7 shows a variant wherein crossed evacuating grooves are provided for the outlet ports.

Figure 11:
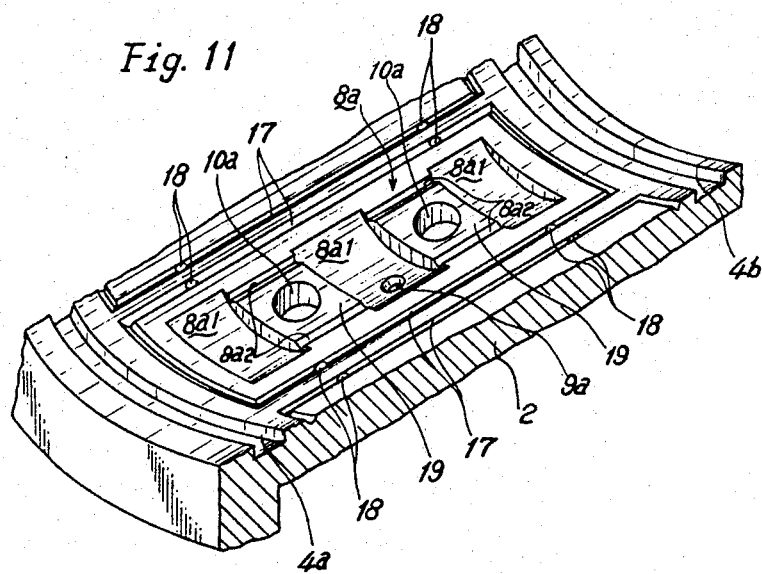
FIG. 11 is an enlarged partial perspective showing a main part of the bearing surface shown in FIG. 8.

Next, by referring to FIGS. 8, 9, 10 and 11, a second example of the invention will be explained as follows:

As shown in the first example of FIG. 1, a plurality of axially extended pressure compensating zones 8a, 8b . . . are distributed in circumferentially spaced and separated relation in the bearing surface 3. Each pressure compensating zone is of the same construction as that of FIG. 1 and also forms an independent enclosure. In this example, a narrow groove 17 is provided so as to surround each independent pressure compensating zone 8a, 8b . . ., and said narrow groove is supplied with pressure fluid having a constant pressure at its inlet port selectively located in said groove, said constant pressure P2 being selected as not higher than the pressure P1 supplied into said pressure compensating zone. Thus, each pressure compensating zone distributed in circumferentially spaced and separated relation and surrounded by said narrow groove supply constant pressure fluid, can work as a perfectly independent pressure compensating zone, and said constant pressure fluid zone surrounding said pressure compensating zone can provide excellent damping action by forming a stable film zone having a constant pressure. In FIGS. 9 and 10, a state of distribution of the fluid pressure acting on the shaft 15 in the bearing surface when the center of the shaft has been deviated from 0 to 01, is shown by pressures Pa, Pb . . . produced in each pressure compensating zone 8a, 8b . . ., by a resultant force F by which the center of the shaft is returned to its original position 0. This force acts as a center force on the bearing and thereby the static rigidity of the bearing is defined. In FIG. 11, the specific construction of this pressure compensating zone of the second example is shown in an enlarged perspective.

In FIGS. 12, 13 and 14, a third example of the invention, wherein a constant pressure fluid zone is established at the fluid film damping zone, is shown.

In this example, each pressure compensating zone distributed in circumferentially spaced and separated relation in the bearing surface has a construction somewhat different from that of the preceding example. At the center of a cavity 22 of said pressure compensating zone, a supply port 23 for pressure fluid is provided, and along the center line of said cavity 22, a land 25 axially extended is provided, in which a plurality of evacuating ports 26 of pressure fluid are located. Surrounding each pressure compensating zone, there is provided a groove 27, at suitable positions of which supply ports 28 for pressure fluid are located to supply fluid having a constant pressure P2 through pipe 35 from outside. From said supply port 23, the pressure fluid having a constant pressure P1 is supplied through pipe 34. Thus, a bearing structure having the same function as that of the second example is realized. In this third example, many evacuating ports 26 are distributed axially in each pressure compensating zone, and therefore the sensitivity of the centering action of the bearing is further increased. In this example, grooves 30 and 31 serve for conducting the fluid having constant pressuree P2, and grooves 32 and 33 serve for evacuating the fluid from the ports 26 through channel 36 and annular groove 4b, and a groove 29 serves for supplying the fluid of higher pressure P1 to the ports 23.

In the above, the present invention has been explained with reference to the examples of radial type bearing structures, whereas the invention is also applicable to thrust type bearing structures. Moreover, it is to be understood that the present invention can comprise many variants.

What we claim is:

1. Fluid bearing comprising means defining a bearing surface with a rotating shaft, a plurality of axially extending pressure compensating zones distributed in circumferentially spaced and separated relation in said bearing surface, each said pressure compensating zone having a plurality of axially spaced cavities with a raised land between adjacent cavities, and axial grooves in said land providing communication between the cavities whereby each pressure compensating zone is an independent enclosure, each pressure compensating zone being provided with at least one inlet port for the introducing of pressure fluid and at least one outlet port for the evacuating of pressure fluid, and a plurality of fluid film damping zones axially extending between said pressure compensating zones, said pressure compensating zones cooperatively defining an overall pressure compensating region adapted to correct automatically deviations of the rotating shaft, and said fluid film damping zones cooperatively defining an overall fluid film damping region adapted to suppress oscillating movements of the rotating shaft under oscillating load.

2. A bearing as claimed in claim 1 wherein said bearing surface is provided with grooves surrounding said pressure compensating zones and being provided with inlet ports adapted for being supplied with pressure fluid having a constant pressure, whereby said damping zones are supplied with fluid and each said pressure compensating zone operates as an independent pressure compensating zone separated from the others.

3. A bearing as claimed in claim 2 comprising means for supplying pressure fluid having a contant value of pressure lower than that of the pressure fluid fed into the pressure compensating zones, the latter said means being coupled to said grooves surrounding the pressure compensating zones.

4. A bearing as claimed in claim 1 wherein said pressure compensating zones are distributed in said bearing surface such that the spacing between adjacent zones is lower at the bottom of the bearing surface as compared to the top of the bearing surface.

5. A bearing as claimed in claim 1 wherein said inlet port is in a cavity and said outlet port is in said land.

References Cited

UNITED STATES PATENTS

| | | | |
|---|---|---|---|
| 2,449,297 | 9/1948 | Hoffer | 308—122 |
| 3,347,605 | 10/1967 | Dreyfus et al. | 308—122 |

MARTIN P. SCHWADRON, *Primary Examiner.*

FRANK SUSKO, *Assistant Examiner.*